US012252610B2

(12) United States Patent
Xie et al.

(10) Patent No.: US 12,252,610 B2
(45) Date of Patent: Mar. 18, 2025

(54) POLYESTER FILM FOR COATING IRON AND FILM-COATED METAL PLATE

(71) Applicant: BAOSHAN IRON & STEEL CO., LTD., Shanghai (CN)

(72) Inventors: Long Xie, Shanghai (CN); Hongxing Chen, Shanghai (CN); Jingge Dai, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 1037 days.

(21) Appl. No.: 17/277,170

(22) PCT Filed: Sep. 18, 2019

(86) PCT No.: PCT/CN2019/106467
§ 371 (c)(1),
(2) Date: Mar. 17, 2021

(87) PCT Pub. No.: WO2020/057553
PCT Pub. Date: Mar. 26, 2020

(65) Prior Publication Data
US 2021/0371644 A1    Dec. 2, 2021

(30) Foreign Application Priority Data

Sep. 19, 2018 (CN) .......................... 201811090656.1

(51) Int. Cl.
| | |
|---|---|
| C08L 67/02 | (2006.01) |
| B29C 55/02 | (2006.01) |
| B29C 55/12 | (2006.01) |
| B29K 67/00 | (2006.01) |
| B29L 7/00 | (2006.01) |
| B29L 31/00 | (2006.01) |
| B32B 15/09 | (2006.01) |
| B32B 15/18 | (2006.01) |
| B32B 37/06 | (2006.01) |

(52) U.S. Cl.
CPC ............ *C08L 67/02* (2013.01); *B29C 55/023* (2013.01); *B29C 55/12* (2013.01); *B32B 15/09* (2013.01); *B32B 15/18* (2013.01); *B32B 37/06* (2013.01); *B29K 2067/003* (2013.01); *B29L 2007/008* (2013.01); *B29L 2031/712* (2013.01); *B32B 2307/518* (2013.01); *B32B 2439/70* (2013.01); *C08L 2203/16* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 5,434,000 | A | * 7/1995 | Konagaya | ................ C08K 3/22 |
| | | | | 428/323 |
| 5,858,282 | A | 1/1999 | Seiner et al. | |

FOREIGN PATENT DOCUMENTS

| | | |
|---|---|---|
| CN | 1386795 A | 12/2002 |
| CN | 1616518 A | 5/2005 |
| CN | 101922035 A | 12/2010 |
| CN | 104002418 A * | 8/2014 |
| CN | 106427149 A * | 2/2017 |
| CN | 105985612 B | 6/2018 |
| EP | 1262523 A1 | 12/2002 |

OTHER PUBLICATIONS

CN104002418 English Machine Translation, prepared Sep. 27, 2023. (Year: 2023).*
CN106427149 English Machine Translation, prepared Sep. 27, 2023. (Year: 2023).*
International Search Report mailed on Dec. 11, 2019 for PCT Patent Application No. PCT/CN2019/106467.
Written Opinion mailed on Dec. 11, 2019 for PCT Patent Application No. PCT/CN2019/106467.
EP Search Report dated dated Jan. 9, 2021 for EP App No. 19862151.8.
EP Search Report for EP App No. 19863378.6 dated Oct. 12, 2021.
OA from Intellectual Property Office of The Philippines Bureau of Patents Apr. 26, 2022.

* cited by examiner

*Primary Examiner* — Christopher M Rodd
(74) *Attorney, Agent, or Firm* — Lei Fang, Esq.; Smith Tempel Blaha LLC

(57) ABSTRACT

Disclosed is a blended polyester thin film, comprising a copolyester and a homopolyester. The thin film is composed of upper, middle, and lower layers. Each of the three layers is a homogeneous mixture of the copolyester and the homopolyester. The copolyester comprises 800-2000 ppm by mass of $SiO_2$ added by means of in-situ polymerization. A dihydric alcohol component in the copolyester comprises ethylene glycol, 1,4-cyclohexanedimethanol, and 1,4-butanediol. The melting point of the copolyester is between 200-240° C. The blended polyester film of the present invention has excellent processability, excellent chemical resistance, such as acid and alkali resistance, and excellent uniformity. A film-coated metal plate prepared from the blended polyester thin film can meet performance requirements of metal containers for food and beverage packaging with complex molding processing and high corrosion resistance.

20 Claims, No Drawings

POLYESTER FILM FOR COATING IRON AND FILM-COATED METAL PLATE

CROSS-REFERENCE TO RELATED APPLICATIONS

This application is a 371 U.S. National Phase of PCT International Application No. PCT/CN2019/106467 filed on Sep. 18, 2019, which claims benefit and priority to Chinese patent application no. CN 201811090656.1 filed on Sep. 19, 2018, the contents of both are incorporated by reference herein in their entiries.

TECHNICAL FIELD

The present disclosure relates to the field of film-laminated metal plates for metal packaging, and more particularly to a polyester steel-laminating film and a film-laminated metal plate.

BACKGROUND ART

In recent years, the development of the polyethylene terephthalate (polyester) industry is very rapid. There are a large number of well-known domestic and foreign companies producing polyester materials and polyester equipment. In 1987, the output of polyester across the world has leapt to the fifth rank among the engineering plastics. Film represents an important branch in the applications of polyester materials, and it is widely used for packaging food and beverages. In recent years, due to the rise of the technology for laminating films on metals, bonding a steel-laminating film (i.e. a film to be laminated on steel) to a metal plate by hot melt lamination has solved the problem of precipitation of harmful bis-phenol A substances caused by an indispensable step of coating the inside of metal cans in a traditional process. This problem has attracted worldwide concern. As the technology for laminating films on metal plates is spread gradually, steel-laminating films have been widely accepted as a substitute for coatings for improving the safety of canned food.

In the prior art, when modified polyester films are used to be laminated on metal plates for metal packaging, various molding requirements can be basically satisfied. However, when it comes to a functional steel-laminating film which not only satisfies the molding requirements, but also exhibits resistance to chemicals such as acids and bases, there is still large room for technical optimization.

SUMMARY

An object of the present disclosure is to provide a film-laminated metal plate having excellent processability, excellent chemical resistance such as acid and base resistance, and excellent uniformity, prepared by using a polyester steel-laminating film.

In order to achieve the above object, the following technical solution is adopted according to the present disclosure.

According to one aspect of the present disclosure, a blended polyester film is provided, wherein the blended polyester film comprises a copolyester and a homopolyester, wherein the blended polyester film comprises three layers including an upper layer, an intermediate layer, and a lower layer, wherein each of the three layers comprises a mixture of the copolyester and the homopolyester that are mixed homogeneously, and wherein the copolyester comprises 800-2000 ppm $SiO_2$ based on parts by mass.

In the blended polyester film according to one aspect of the present disclosure, $SiO_2$ in the copolyester is added by in-situ polymerization.

In the blended polyester film according to one aspect of the present disclosure, the copolyester comprises a glycol component selecting from the group consisting of ethylene glycol, 1,4-cyclohexanedimethanol and 1,4-butanediol.

In the blended polyester film according to one aspect of the present disclosure, the copolyester and the homopolyester in the blended polyester film has a mass ratio of 8:2 to 5:5.

In the blended polyester film according to one aspect of the present disclosure, the copolyester and the homopolyester in each layer has a mass ratio of 8:2 to 5:5.

In the blended polyester film according to one aspect of the present disclosure, the mass ratios of the copolyester and the homopolyester are 8:2, 7:3 and 5:5, respectively.

In the blended polyester film according to one aspect of the present disclosure, the copolyester has a melting point of 200-240° C.

In the blended polyester film according to one aspect of the present disclosure, the blended polyester film is prepared using a biaxial stretching process at a manufacturing temperature of 250-270° C.

In the above embodiments, the in-situ addition of 800-2000 ppm by mass of $SiO_2$ to the copolyester not only meets the basic requirement of an anti-blocking agent, but also helps to improve the overall performance of the film significantly.

According to another aspect of the present disclosure, there is provided a film-laminated metal plate comprising a metal substrate and the abovementioned blended polyester film laminated on a surface of the metal substrate.

In the film-laminated metal plate according to another aspect of the present disclosure, the metal substrate comprises a material selected from the group consisting of a chromium-plated steel plate, a tin-plated steel plate, a low-tin steel plate (i.e., a steel plate having a tin coating weight of <1.1 $g/m^2$), a galvanized steel plate, a cold rolled steel plate and a stainless steel plate.

In the film-laminated metal plate according to another aspect of the present disclosure, the blended polyester film is directly thermally laminated on the surface of the metal substrate by hot melt lamination at a pressure of 2-10 Kg and a temperature of 180-260° C.

In the film-laminated metal plate according to another aspect of the present disclosure, the metal substrate has a thickness of 0.10-0.50 mm.

According to still another aspect of the present disclosure, there is provided a metal container for food or beverage packaging, made of the abovementioned film-laminated metal plate.

Compared with the prior art, the present disclosure shows the following beneficial effects:

According to the present disclosure, the blended polyester film is laminated to the metal plate by thermal lamination, so that the film-laminated metal plate prepared from the blended polyester film can simultaneously meet the requirements of complex molding processing and highly corrosion resistant metal containers for packaging food and beverage. Since 800-2000 ppm of $SiO_2$ is added to the copolyester of the polyester steel-laminating film by in-situ polymerization, conventional silicon-containing polyester chips are not used, and no high-temperature polyester resin (having a melting point of greater than 245° C.) is involved. As a result, not only the basic requirements of a traditional $SiO_2$ anti-blocking agent are satisfied, but also the overall performance of the film can be improved significantly.

Due to the addition of $SiO_2$ to the polymer by in-situ polymerization, the crystallization properties of the polyester film are improved uniformly on the whole. By substituting the traditional way of adding $SiO_2$ in the form of master batch, addition of a high melting point resin to the film is avoided. The above two points have improved the overall performance of the polyester film significantly, and the complex processing endurance and corrosion resistance of the film-laminated steel comprising the film of the present disclosure have been improved notably.

DETAILED DESCRIPTION

In the following detailed description, the objectives, features, and advantages of the present disclosure will become clearer and more apparent with reference to the non-limiting examples. The content is sufficient to enable those skilled in the art to appreciate and implement the present disclosure.

The blended polyester film according to the present disclosure comprises a copolyester and a homopolyester, wherein the blended polyester film comprises three layers including an upper layer, an intermediate layer, and a lower layer, wherein each of the three layers comprises a mixture of the copolyester and the homopolyester that are mixed homogeneously, and wherein the copolyester comprises 800-2000 ppm $SiO_2$ based on parts by mass. Preferably, the $SiO_2$ is added to the copolyester by in-situ polymerization. Preferably, $SiO_2$ in the copolyester has the content of 1300-2000 ppm by mass. The term "added by in-situ polymerization" or the like as used herein refers to mixing $SiO_2$ with the monomers for synthesizing the copolyester, and then polymerizing to produce the copolyester according to the present disclosure.

In the present disclosure, polyester is formed by polymerization of terephthalic acid and diol. Preferably, in the copolyester of the present disclosure, the diol component includes ethylene glycol, 1,4-cyclohexanedimethanol and 1,4-butanediol. Preferably, the amount of the diol component is selected so that the melting point of the copolyester obtained by polymerization is between 200 and 240° C. The copolyester of the present disclosure can be obtained by polymerization using the polymerization methods known in the art.

Preferably, the homopolyester of the present disclosure is obtained by polymerizing terephthalic acid with ethylene glycol or butanediol. In some embodiments, a vacuum of 20-50 ppm is used in the polycondensation process, the reaction temperature is in the range of 270-290° C., and the reaction time is in the range of 2-4 h. Preferably, the melting point of the homopolyester used in the present disclosure is in the range of 250-265° C., preferably 255-265° C.

Preferably, the mass ratio of the copolyester to the homopolyester in the blended polyester film according to the present disclosure is in the range of 8:2 to 5:5. Preferably, in the blended polyester film according to the present disclosure, the mass ratio of the copolyester to the homopolyester in each layer may be the same or different, and may range from 8:2 to 5:5, such as 8:2, 7:3 and 5:5, respectively.

In the blended polyester film of the present disclosure, the blended polyester film is prepared by using a biaxial stretching process at a manufacturing temperature of 250-270° C.

There is also provided a method of manufacturing the blended polyester film according to the present disclosure, wherein the method comprises:

(1) providing a mixture of the copolyester and the homopolyester according to any of the embodiments herein; and
(2) using a biaxial stretching process to manufacture the polyester film at 250-270° C. There is also provided use of $SiO_2$ in improving the crystallization performance of the polyester film according to the present disclosure. Preferably, the blended polyester film is one that is described in any of the embodiments herein.

Example 1

A method of producing a polyester steel-laminating film, wherein the polyester steel-laminating film was manufactured by using a biaxial stretching process at a manufacturing temperature of 250-270° C., wherein the polyester steel-laminating film comprised 7 parts of copolyester and 3 parts of homopolyester. The diol in the copolyester was a mixture of ethylene glycol, 1,4-cyclohexanedimethanol and 1,4-butanediol, and its melting point was 200° C. The polyester steel-laminating film was manufactured by using a three-layer co-extrusion biaxial stretching process, wherein the mixture of the copolyester and homopolyester which were mixed homogeneously was divided into three layers: an upper layer, an intermediate layer and a lower layer, wherein the copolyester comprised 1300 ppm of $SiO_2$.

The prepared biaxially stretched polyester film was thermally bonded to the surface of a thin metal plate having a thickness of 0.10-0.50 mm under a pressure of 2-10 kg and a temperature of 180-260° C. to obtain a film-laminated metal plate.

Example 2

A method of producing a polyester steel-laminating film, wherein the polyester steel-laminating film was manufactured by using a biaxial stretching process at a manufacturing temperature of 250-270° C., wherein the polyester steel-laminating film comprised 5 parts of copolyester and 5 parts of homopolyester. The diol in the copolyester was a mixture of ethylene glycol, 1,4-cyclohexanedimethanol and 1,4-butanediol, and its melting point was 230° C. The polyester steel-laminating film was manufactured by using a three-layer co-extrusion biaxial stretching process, wherein the mixture of the copolyester and homopolyester which were mixed homogeneously was divided into three layers: an upper layer, an intermediate layer and a lower layer, wherein the copolyester comprised 2000 ppm of $SiO_2$.

The prepared biaxially stretched polyester film was thermally bonded to the surface of a thin metal plate having a thickness of 0.10-0.50 mm under a pressure of 2-10 kg and a temperature of 180-260° C. to obtain a film-laminated metal plate.

Example 3

A method of producing a polyester steel-laminating film, wherein the polyester steel-laminating film was manufactured by using a biaxial stretching process at a manufacturing temperature of 250-270° C., wherein the polyester steel-laminating film comprised 8 parts of copolyester and 2 parts of homopolyester. The diol in the copolyester was a mixture of ethylene glycol, 1,4-cyclohexanedimethanol and 1,4-butanediol, and its melting point was 240° C. The polyester steel-laminating film was manufactured by using a three-layer co-extrusion biaxial stretching process, wherein the mixture of the copolyester and homopolyester which were mixed homogeneously was divided into three layers: an upper layer, an intermediate layer and a lower layer, wherein the copolyester comprised 800 ppm of $SiO_2$.

The prepared biaxially stretched polyester film was thermally bonded to the surface of a thin metal plate having a thickness of 0.10-0.50 mm under a pressure of 2-10 kg and a temperature of 180-260° C. to obtain a film-laminated metal plate.

Example 4

A method of producing a polyester steel-laminating film, wherein the polyester steel-laminating film was manufactured by using a casting process at a manufacturing temperature of 250-270° C., wherein the polyester steel-laminating film comprised 8 parts of copolyester and 2 parts of homopolyester. The diol in the copolyester was a mixture of ethylene glycol, 1,4-cyclohexanedimethanol and 1,4-butanediol, and its melting point was 220° C. The polyester steel-laminating film was manufactured by using a three-layer co-extrusion biaxial stretching process, wherein the mixture of the copolyester and homopolyester which were mixed homogeneously was divided into three layers: an upper layer, an intermediate layer and a lower layer, wherein the copolyester comprised 1500 ppm of $SiO_2$.

The prepared biaxially stretched polyester film was thermally bonded to the surface of a thin metal plate having a thickness of 0.10-0.50 mm under a pressure of 2-10 kg and a temperature of 180-260° C. to obtain a film-laminated metal plate.

Example 5

A method of producing a polyester steel-laminating film, wherein the polyester steel-laminating film was manufactured by using a casting process at a manufacturing temperature of 250-270° C., wherein the polyester steel-laminating film comprised 5 parts of copolyester and 5 parts of homopolyester. The diol in the copolyester was a mixture of ethylene glycol, 1,4-cyclohexanedimethanol and 1,4-butanediol, and its melting point was 200° C. The polyester steel-laminating film was manufactured by using a three-layer co-extrusion biaxial stretching process, wherein the mixture of the copolyester and homopolyester which were mixed homogeneously was divided into three layers: an upper layer, an intermediate layer and a lower layer, wherein the copolyester comprised 1800 ppm of $SiO_2$.

The prepared biaxially stretched polyester film was thermally bonded to the surface of a thin metal plate having a thickness of 0.10-0.50 mm under a pressure of 2-10 kg and a temperature of 180-260° C. to obtain a film-laminated metal plate.

Example 6

A method of producing a polyester steel-laminating film, wherein the polyester steel-laminating film was manufactured by using a biaxial stretching process at a manufacturing temperature of 250-270° C., wherein the polyester steel-laminating film comprised 7 parts of copolyester and 3 parts of homopolyester. The diol in the copolyester was a mixture of ethylene glycol, 1,4-cyclohexanedimethanol and 1,4-butanediol, and its melting point was 230° C. The polyester steel-laminating film was manufactured by using a three-layer co-extrusion biaxial stretching process, wherein the mixture of the copolyester and homopolyester which were mixed homogeneously was divided into three layers: an upper layer, an intermediate layer and a lower layer, wherein the copolyester comprised 1300 ppm of $SiO_2$.

The prepared biaxially stretched polyester film was thermally bonded to the surface of a thin metal plate having a thickness of 0.10-0.50 mm under a pressure of 2-10 kg and a temperature of 180-260° C. to obtain a film-laminated metal plate.

Comparative Example 1

A monolayer polyester film was made from a modified PET resin having a melting point of 210° C. by using a casting process.

Preparation of film-laminated steel: the monolayer polyester film prepared using the casting process was thermally bonded to the surface of a 0.19 mm chromium-plated steel plate at a pressure of 2-10 kg and a temperature of 180-260° C. to obtain the film-laminated steel.

Comparative Example 2

In a three-layer biaxially stretched polyester film, the upper layer comprised a 3 μm PET resin, the intermediate layer comprised a 14 μm blended resin of 265° C. PET and 210° C. PET (having a blending ratio of 7:3), and the lower layer comprised a 3 μm modified PET resin having a melting point of 210° C. The proportion of the copolyester in this polyester film was less than 30%.

Preparation of film-laminated steel: the prepared biaxial stretched polyester film was thermally bonded to the surface of a 0.19 mm chromium-plated steel plate at a pressure of 2-10 kg and a temperature of 180-260° C. to obtain the film-laminated steel, wherein the lower layer was thermally laminated on the steel plate.

Test Example

The film-laminated metal plates obtained in Examples 1-6 and Comparative Examples 1-2 were processed using the Draw and Redraw process (DRD) under the following processing conditions. They were formed into can bodies by punching three times. The 20 μm film prepared in each example was located on both the inner and outer sides of the cans at the same time.

Processing Conditions (Draw and Redraw Process)
1. Blank diameter: 172 mm.
2. First-pass processing conditions
Punch diameter: 114.5 mm;
Die clearance: 0.36 mm;
Blank holder force: 4000 kg;
Mold assembly temperature before molding: 55° C.
3. Second-pass processing conditions
Punch diameter: 88 mm;
Die clearance: 0.4 mm;
Blank holder force: 3000 kg;
Mold assembly temperature before molding: 55° C.
4. Third-pass processing conditions
Punch diameter: 65.3 mm;
Die clearance: 0.43 mm;
Blank holder force: 2000 kg;
Mold assembly temperature before molding: 55° C.
After molding, conventional processes in can making are used for necking and flanging.

The cans prepared by the above methods were evaluated by the methods described below, and the results are shown in Table 1.

(1) Adhesion of Resin Film in Processing

The resin film layer laminated on the steel plate surface was visually evaluated to see whether it was peeled off or not during the processing steps of the DRD can prepared under the abovementioned forming and processing conditions. The result where no peeling occurred till the final step is excellent.

(2) Acid resistance performance: After the film-laminated steel was punched into a can (can size 691), acid resistance performance evaluation was performed to represent corrosion resistance performance evaluation. The film-laminated can was filled with a 20 g/L citric acid solution. After the can was capped, the solution was boiled at 121° C. for 60 min. After cooling, the sample was taken out, and spots corroded by the acid on the surface of the sample were observed to evaluate the acid resistance performance of the film-laminated steel.

(3) Sulfur resistance performance: After the film-laminated steel was punched into a can (can size 691), sulfur resistance performance evaluation was performed to represent corrosion resistance performance evaluation. The film-laminated can was filled with a 1% $Na_2S$ solution. After the can was capped, the solution was boiled at 121° C. for 60 min. After cooling, the sample was taken out, and sulfide spots on the surface of the sample were observed to evaluate the sulfur resistance performance of the film-laminated steel.

TABLE 1

Evaluation results of deep drawing endurance and corrosion resistance

| Test Item | Deep Drawing Endurance | Acid Resistance | Sulfur Resistance |
|---|---|---|---|
| Example 1 | ⊚ | ⊚ | ⊚ |
| Example 2 | o | ⊚ | ⊚ |
| Example 3 | ⊚ | ⊚ | o |
| Example 4 | ⊚ | ⊚ | ⊚ |
| Example 5 | o | ⊚ | ⊚ |
| Example 6 | ⊚ | ⊚ | ⊚ |
| Comparative Example 1 | ⊚ | o | Δ |
| Comparative Example 2 | X | – | – |

Note:
in Table 1, X means poor; Δ means mediocre; o means good; ⊚ means very good; –means unable to be evaluated.

In the above six Examples, the copolyester and homopolyester were blended and then formed into films. The moldability of the films made by both the casting process and the biaxial stretching process is good, and the polyester steel-laminating films having a small thickness can be prepared. In addition, the film-laminated metal plates prepared by using the polyester steel-laminating films have excellent punching resistance and ductility, as well as excellent chemical resistance such as acid and base resistance. In addition, by adding $SiO_2$ to the copolyester in the in-situ synthesis, no conventional silicon-containing polyester chips are used in the polyester steel-laminating films, so no high-temperature polyester resin (having a melting point of greater than 245° C.) is involved, which can significantly improve the uniformity of the overall performances of the film-laminated metal plates. At the same time, the addition of $SiO_2$ is conducive to the winding and unwinding of the polyester steel-laminating film.

Due to the addition of $SiO_2$ to the polymer in the in-situ polymerization, the crystallization properties of the polyester film are improved uniformly on the whole. By substituting the traditional way of adding $SiO_2$ in the form of master batch, addition of a high melting point resin to the film is avoided. The above two points have improved the overall performance of the polyester film significantly, and the complex processing endurance and corrosion resistance of the film-laminated steel comprising the film of the present disclosure have been improved notably.

Finally, it should be pointed out that although the present disclosure has been described with reference to the current specific examples, those skilled in the art should appreciate that the above examples are only used to illustrate the present disclosure, and are not used to limit the present disclosure. Various equivalent changes or substitutions can be made without departing from the concept of the present disclosure. Therefore, without departing from the essential spirit of the present disclosure, all changes and variations of the abovementioned examples will fall in the scope of the claims in the present disclosure.

The invention claimed is:

1. A blended polyester film, wherein the blended polyester film comprises a copolyester and a homopolyester, wherein the blended polyester film comprises three layers including an upper layer, an intermediate layer, and a lower layer, wherein each of the three layers is a mixture of the copolyester and the homopolyester that are mixed homogeneously, and wherein the copolyester comprises, based on parts by mass, 800-2000 ppm of $SiO_2$ added by in-situ polymerization.

2. The blended polyester film according to claim 1, wherein the copolyester comprises a diol component selecting from the group consisting of ethylene glycol, 1,4-cyclohexanedimethanol and 1,4-butanediol.

3. The blended polyester film according to claim 1, wherein the copolyester and the homopolyester in the blended polyester film have a mass ratio of 8:2 to 5:5.

4. The blended polyester film according to claim 3, wherein the mass ratios of the copolyester and the homopolyester are 8:2, 7:3 and 5:5, respectively.

5. The blended polyester film according to claim 1, wherein the copolyester has a melting point of 200-240° C.

6. The blended polyester film according to claim 1, wherein the homopolyester is a homopolymer of terephthalic acid with ethylene glycol or butanediol.

7. A method of manufacturing the blended polyester film according to claim 1, wherein the method comprises:
(1) providing a mixture of the copolyester and the homopolyester; and
(2) using a biaxial stretching process to manufacture the polyester film at 250-270° C.

8. A film-laminated metal plate comprising a metal substrate and the blended polyester film of claim 1 laminated on a surface of the metal substrate.

9. The film-laminated metal plate according to claim 8, wherein the metal substrate comprises a material selected from the group consisting of a chromium-plated steel plate, a tin-plated steel plate, a low-tin steel plate, a galvanized steel plate, a cold rolled steel plate and a stainless steel plate.

10. The film-laminated metal plate according to claim 8, wherein the metal substrate has a thickness of 0.10-0.50 mm.

11. A method of manufacturing the film-laminated metal plate according to claim 8, wherein the method comprises direct thermal lamination of the blended polyester film on a surface of the metal substrate by hot melt lamination at a pressure of 2-10 kg and a temperature of 180-260° C.

12. A metal container for food or beverage packaging, wherein the metal container is made of the film-laminated metal plate of claim 8.

13. The blended polyester film according to claim 2, wherein the copolyester and the homopolyester in the blended polyester film have a mass ratio of 8:2 to 5:5.

14. The blended polyester film according to claim 2, wherein the copolyester has a melting point of 200-240° C.

15. The film-laminated metal plate according to claim 8, wherein the copolyester of the blended polyester film comprises a diol component selecting from the group consisting of ethylene glycol, 1,4-cyclohexanedimethanol and 1,4-butanediol.

16. The film-laminated metal plate according to claim 8, wherein the copolyester and the homopolyester in the blended polyester film have a mass ratio of 8:2 to 5:5.

17. The film-laminated metal plate according to claim 16, wherein the mass ratios of the copolyester and the homopolyester are 8:2, 7:3 and 5:5, respectively.

18. The film-laminated metal plate according to claim 8, wherein the copolyester of the blended polyester film has a melting point of 200-240° C.

19. The film-laminated metal plate according to claim 8, wherein the homopolyester of the blended polyester film is a homopolymer of terephthalic acid with ethylene glycol or butanediol.

20. The metal container for food or beverage packaging according to claim 12, wherein the metal substrate of the film-laminated metal plate comprises a material selected from the group consisting of a chromium-plated steel plate, a tin-plated steel plate, a low-tin steel plate, a galvanized steel plate, a cold rolled steel plate and a stainless steel plate, or wherein the metal substrate has a thickness of 0.10-0.50 mm.

* * * * *